(12) United States Patent  
Umlauft et al.

(10) Patent No.: US 9,340,287 B2  
(45) Date of Patent: May 17, 2016

(54) PASSENGER SERVICE SYSTEM WITH IMPROVED AIR GUIDANCE

(71) Applicant: AIRBUS OPERATIONS GMBH, Hamburg (DE)

(72) Inventors: Sebastian Umlauft, Hamburg (DE); Robert Thomas, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 336 days.

(21) Appl. No.: 13/868,692

(22) Filed: Apr. 23, 2013

(65) Prior Publication Data

US 2013/0286673 A1 Oct. 31, 2013

Related U.S. Application Data

(60) Provisional application No. 61/637,876, filed on Apr. 25, 2012.

(30) Foreign Application Priority Data

Apr. 25, 2012 (DE) .................. 10 2012 008 264

(51) Int. Cl.
*B64D 11/00* (2006.01)
*B60H 1/24* (2006.01)
*B64D 13/00* (2006.01)
*B64D 13/06* (2006.01)

(52) U.S. Cl.
CPC ............... *B64D 11/00* (2013.01); *B60H 1/245* (2013.01); *B64D 13/06* (2013.01); *B64D 2011/0053* (2013.01); *B64D 2013/003* (2013.01); *B64D 2013/0625* (2013.01)

(58) Field of Classification Search
USPC ............ 362/470, 471, 488, 490; 454/76, 265
See application file for complete search history.

(56) References Cited

U.S. PATENT DOCUMENTS

| 2,516,805 | A | * | 7/1950 | Rother et al. .................. 454/76 |
| 2,526,828 | A | * | 10/1950 | Phillips ....................... 138/103 |
| 2,730,866 | A | | 1/1956 | Baker |
| 4,726,285 | A | | 2/1988 | Kelley |
| 6,203,180 | B1 | * | 3/2001 | Fleischmann ................. 362/471 |
| 2003/0048641 | A1 | * | 3/2003 | Alexanderson et al. ...... 362/470 |
| 2008/0310177 | A1 | * | 12/2008 | Clark ..................... B60Q 3/025 362/471 |
| 2010/0012780 | A1 | | 1/2010 | Kohlmeier-Beckmann |
| 2012/0032027 | A1 | | 2/2012 | Gehm |
| 2012/0312921 | A1 | | 12/2012 | Grosse-Plankermann |
| 2013/0118493 | A1 | | 5/2013 | Umlauft |
| 2013/0149950 | A1 | | 6/2013 | Umlauft |

FOREIGN PATENT DOCUMENTS

DE  37 40 714   6/1988
DE  40 15 376   11/1991

(Continued)

*Primary Examiner* — Laura Tso
(74) *Attorney, Agent, or Firm* — Dickinson Wright PLLC

(57) ABSTRACT

A passenger service system includes an individual ventilation arrangement and/or a lighting arrangement, wherein at least one air nozzle of the individual ventilation arrangement and/or at least one reading lamp of the lighting arrangement is/are disposed in the region of a service surface of the passenger service system. The service surface of the passenger service system includes a substantially flat portion as well as a buckled portion, which is curved convexly relative to the substantially flat portion and extends along a longitudinal axis ($L_P$) of the passenger service system.

16 Claims, 3 Drawing Sheets

(56) References Cited

FOREIGN PATENT DOCUMENTS

| DE | 102 58 748 | 6/2004 |
|---|---|---|
| DE | 10 2008 033 733 | 1/2010 |
| DE | 10 2009 018 111 | 10/2010 |
| DE | 10 2009 058 849 | 6/2011 |
| DE | 10 2010 018 569 | 11/2011 |
| DE | 10 2011 116 884 | 4/2013 |
| WO | 2011/079906 | 7/2011 |
| WO | 2011/134615 | 11/2011 |

* cited by examiner

PASSENGER SERVICE SYSTEM WITH IMPROVED AIR GUIDANCE

CROSS REFERENCE TO RELATED APPLICATIONS

This application is entitled to and claims the benefit of German Application No. DE 10 2012 008 264.9 filed Apr. 25, 2012 and U.S. Provisional Application No. 61/637,876, filed Apr. 25, 2012, the disclosures of each of which, including the specification, claims, drawings and abstract, are incorporated herein by reference in their entirety.

FIELD

The invention relates to a passenger service system provided in particular for installation in a passenger cabin of a vehicle as well as to a passenger cabin area equipped with such a passenger service system.

BACKGROUND

The passenger cabin of a modern commercial aircraft is conventionally equipped with a plurality of personal service units (PSUs), which are associated in each case with a row of passenger seats and disposed below overhead luggage compartments in a position accessible to the passengers seated on the passenger seats and integrated into PSU panels forming part of the aircraft cabin panelling. A typical PSU, such as is described for example in DE 10 2009 058 849 A1 and WO 2011/079906 A2, comprises a loudspeaker, a display element, at which for example a fasten-seat-belt sign is displayed, as well as one or more reading lamps. An individually adjustable air nozzle for each passenger seat of a seat row is moreover integrated into a conventional PSU. The air nozzle is connected to an individual ventilation system that is constructed separately from a centrally regulated cabin ventilation system. To regulate the air stream fed via the air nozzle into the passenger cabin a passenger may adjust an air outlet cross section of the air nozzle in a desired manner, for example by rotating a corresponding shutter element. The air provided by the centrally regulated cabin ventilation system, on the other hand, is typically blown into the passenger cabin through air outlets that are disposed in a side wall region of the passenger cabin between an upper edge of the side panelling and the PSU panels.

It is further known from DE 10 2010 018 569 A1 and WO 2011/134615 A2 to integrate components of a centrally regulated cabin ventilation system, components of an emergency oxygen supply system and modules of an individual ventilation system comprising in each case a plurality of air nozzles into a carrier structure, which is disposed below the overhead luggage compartments above the seat rows and extends substantially parallel to a longitudinal axis of the aircraft passenger cabin.

Finally, the non-prior publication DE 10 2011 116 884 describes a passenger service module comprising a mounting element that is used to fix the passenger service module in its assembly position in an aircraft. Connected to the mounting element are an individual ventilation arrangement comprising a plurality of air nozzles and a lighting arrangement comprising a plurality of reading lamps. Finally, the passenger service module comprises an operator control element that is connected to the mounting element and has a touch panel comprising a plurality of input fields for individual control of the air nozzles and the reading lamps.

SUMMARY

The invention is geared to the object of providing a passenger service system and a vehicle cabin area that enable an improved flow guidance of conditioned air that is blown into a vehicle cabin.

This object is achieved by a passenger service system having features of attached claims and by a vehicle cabin area having features of attached claims.

A passenger service system according to the invention comprises an individual ventilation arrangement and/or a lighting arrangement. At least one air nozzle of the individual ventilation arrangement and/or at least one reading lamp of the lighting arrangement is/are disposed in the region of a service surface of the passenger service system. If desired, the individual ventilation arrangement of the passenger service system may be equipped with a plurality of air nozzles, wherein preferably one air nozzle is provided for each seat of a passenger seat row that is supplied with service functions by the passenger service system. In a similar fashion the lighting arrangement may comprise a plurality of reading lamps, wherein preferably one reading lamp is provided for each seat of a passenger seat row that is supplied with service functions by the passenger service system.

The service surface of the passenger service system in the state of assembly of the passenger service system in a vehicle, in particular an aircraft, is disposed preferably in such a way that it is readily accessible to passengers who are seated on passenger seats and supplied with service functions by the passenger service system. For example the service surface may be positioned above the passenger seats over the heads of the passengers seated on the passenger seats. When the passenger service system is mounted in the passenger cabin of a vehicle, in particular an aircraft, the service surface of the passenger service system preferably extends above the passenger seat rows between overhead luggage compartments provided in the passenger cabin and side panelling of the passenger cabin.

The service surface comprises a substantially flat portion as well as a buckled portion, which is curved convexly relative to the substantially flat portion and extends along a longitudinal axis of the passenger service system. In the state of assembly of the passenger service system in a vehicle, in particular an aircraft, the longitudinal axis of the passenger service system extends preferably parallel to the longitudinal axis of the passenger cabin of the vehicle, so that the buckled portion formed in the service surface of the passenger service system also extends in a direction parallel to the longitudinal axis of the vehicle passenger cabin.

Here, by a "substantially flat portion of a service surface" is meant a portion which, in comparison to the convexly curved buckled portion, has no significant curvature. It is however self-evident that a "substantially flat portion of a service surface" in the sense of this application may have construction-, design- or production-related uneven areas, but also functionally essential projections, cutouts or notches so long as these in relation to the convexly curved buckled portion are irrelevant to the subsequently described influencing of the flow guidance of conditioned air that is fed into a passenger cabin of a vehicle, in particular an aircraft.

Because of the Coanda effect, conditioned air that is fed into a passenger cabin of a vehicle, in particular an aircraft, and is provided for example by a centrally regulated cabin ventilation system has the tendency to flow along surfaces of the cabin internal panelling that face an interior of the vehicle cabin. In other words, the flow of the conditioned air fed into the vehicle cabin preferably follows the contour of the internal panelling, thereby resulting in a high concentration of fresh air in the region of the surfaces of the internal panelling that face the interior of the vehicle cabin. In order to ensure that the vehicle cabin is uniformly supplied with fresh air, the Coanda effect has to be overcome. This occurs conventionally by means of appropriate control of the volume rate of flow, the input angle and the input rate of the conditioned air.

In the case of the passenger service system according to the invention, the configuration of the service surface with a buckled portion already ensures that a conditioned air stream flowing along the service surface is separated from the contour of the service surface when it encounters the buckled portion. In other words, the buckled portion of the service surface brings about an interruption of the Coanda effect so that the conditioned air stream separates from the service surface and is deflected in the direction of the interior of the vehicle cabin. This enables a more uniform distribution of the conditioned air in the vehicle cabin. By virtue of a suitable arrangement of the passenger service system in the vehicle cabin, for example above seat rows provided in the vehicle cabin, it may additionally be ensured that the buckled portion does not deflect the conditioned air stream in such a way that the air flows directly towards passengers seated on the passenger seats. As a result the air conditioning comfort is maintained for the passengers.

The individual ventilation arrangement and/or the lighting arrangement may be integrated into a passenger service module. Owing to its modular design a passenger service module comprising the individual ventilation arrangement and/or the lighting arrangement may be already preassembled into an independently manipulable subassembly before its final assembly in a vehicle, in particular an aircraft, and may therefore be finally assembled in a particularly simple, time-saving and hence economical manner. A modular design of the passenger service system moreover enables easy reconfiguration of the system, i.e. easy adaptation of the system to different vehicle cabin layouts.

The service surface of the passenger service system is preferably formed at least in sections by at least a portion of a surface of the passenger service module that comprises the at least one air nozzle of the individual ventilation arrangement and/or the at least one reading lamp of the lighting arrangement. For example the passenger service module may comprise a housing, which receives the individual ventilation arrangement and/or the lighting arrangement, and a surface of this housing, in which surface the at least one air nozzle of the individual ventilation arrangement and/or the at least one reading lamp of the lighting arrangement is/are disposed, may form at least a portion of the service surface of the passenger service system.

The service surface of the passenger service system may moreover be formed at least in sections by at least one interior trim panel. In a preferred embodiment of the passenger service system a sub-portion of the service surface is formed by at least a portion of a surface, which comprises the at least one air nozzle of the individual ventilation arrangement and/or the at least one reading lamp of the lighting arrangement, of a passenger service module, which comprises the individual ventilation arrangement and/or the lighting arrangement, and a sub-portion of the service surface is formed by at least one interior trim panel. If desired or necessary, the passenger service system may also comprise a plurality of interior trim panels, which may form in each case a sub-portion of the service surface of the passenger service system.

The interior trim panel preferably has at least one cutout, which exposes a surface portion of the passenger service module that forms a portion of the service surface of the passenger service system.

In a preferred embodiment of the passenger service system the service surface of the passenger service system comprises a further substantially flat portion. The buckled portion preferably extends between the substantially flat portion and the further substantially flat portion of the service surface of the passenger service system. In other words, in a preferred embodiment of the passenger service system the substantially flat portion and the further substantially flat portion of the service surface of the passenger service system are separated from one another by the buckled portion.

The substantially flat portion of the service surface of the passenger service system may be formed by a first interior trim panel. In the state of assembly of the passenger service system in a vehicle cabin the first interior trim panel is disposed preferably above passenger seat rows provided in the vehicle cabin and adjacent to side panelling of the vehicle cabin. If desired or necessary, it is also conceivable to use two or more first interior trim panels to form the substantially flat portion of the surface of the passenger service system.

The further substantially flat portion of the service surface of the passenger service system may be formed by a second interior trim panel. In the state of assembly of the passenger service system in a vehicle cabin the further substantially flat portion of the service surface is disposed preferably above passenger seat rows provided in the vehicle cabin and adjacent to an aisle area of the vehicle cabin. The second interior trim panel may form not only the further substantially flat portion of the service surface of the passenger service system but also at least one sub-portion of the buckled portion. As an alternative to this it is however also conceivable to use a plurality of second interior trim panels to form the further substantially flat portion of the service surface of the passenger service system or to use at least mutually separately formed second interior trim panels to form the further substantially flat portion and at least a sub-portion of the buckled portion of the service surface of the passenger service system.

A display element may be disposed in the region of the buckled portion of the service surface of the passenger service system. The display element may be for example a display element representing an airline logo, seat place numbering or the like. The display element is preferably disposed in the region of a side wall portion of the buckled portion that in the state of installation of the passenger service system in a vehicle cabin faces an aisle area of the vehicle cabin and/or is visible from an aisle area of the vehicle cabin.

Preferably the at least one air nozzle of the individual ventilation arrangement and/or the at least one reading lamp of the lighting arrangement is/are disposed in the region of the buckled portion of the service surface of the passenger service system. For example a housing of a passenger service module comprising the individual ventilation arrangement and/or the lighting arrangement may have a convexly curved surface, in which the at least one air nozzle of the individual ventilation arrangement and/or the at least one reading lamp of the lighting arrangement are disposed. The buckled portion of the service surface of the passenger service system may then be formed by the convexly curved surface of the passenger service module housing.

If desired, the passenger service module housing given such a configuration of the passenger service system may be received in a recess that is formed in an interior trim panel. The interior trim panel in the state of assembly of the passenger service system in a vehicle cabin then covers regions adjacent to the passenger service module but exposes the surface of the passenger service module housing, in which surface the at least one air nozzle of the individual ventilation arrangement and/or the at least one reading lamp of the lighting arrangement is/are disposed, thereby guaranteeing unobstructed operation of the passenger service system.

The interior trim panel may at least in sections be of a convexly curved construction and consequently form at least one sub-portion of the buckled portion of the service surface of the passenger service system. For example a central region of the buckled portion may be formed by a passenger service module housing surface, while an edge region of the buckled portion is formed by a convexly curved interior trim panel. The interior trim panel may be constructed separately or integrally with a first or a second interior trim panel to form the substantially flat portion or the further substantially flat portion of the service surface.

An air outlet of the at least one air nozzle is preferably oriented in such a way relative to the longitudinal axis of the passenger service system that an individual air stream exiting from the air outlet forms an acute angle with the longitudinal axis of the passenger service system. When the passenger service system is installed in a vehicle cabin, in particular an aircraft cabin, the flow path of the individual air stream exiting from the air outlet preferably runs counter to the direction of travel and/or flight at an acute angle to the longitudinal axis of the vehicle cabin and/or aircraft cabin. If the at least one air nozzle was installed in a substantially flat portion of the service surface of the passenger service system, the air nozzle would have to project relatively far from a surrounding surface region in order to guarantee reliable prevention of a flow separation of the individual air stream.

By virtue of the integration of the air nozzle into the buckled portion of the service surface of the passenger service system, the distance between an individual air stream exiting from the air outlet of the air nozzle and a region of the service surface surrounding the air outlet is increased as a result of the curved shape of the buckled portion, in comparison to an arrangement of the air outlet in a substantially flat region of the service surface. Consequently an air nozzle, given the same orientation of the air outlet and hence of the individual air stream relative to the longitudinal axis of the passenger service system, when integrated into the buckled portion of the service surface may project to a lesser extent from a region of the service surface surrounding the air nozzle than would be possible if the air nozzle was integrated into a substantially flat region of the service surface.

Furthermore, a cutout, which is formed in an interior trim panel for receiving an air nozzle oriented at an acute angle to the longitudinal axis of the passenger service system, may be made smaller in the region of the buckled portion than would be possible if the air nozzle was disposed in a substantially flat region of the service surface. The visual appearance of the passenger service system may therefore be substantially improved. What is more, the installation space requirement for the air nozzle may be minimized.

A plurality of air nozzles are preferably disposed successively in the direction of the longitudinal axis of the passenger service system and offset relative to one another in a direction at light angles to the longitudinal axis of the passenger service system. If the air nozzles are additionally positioned in the region of the buckled portion of the service surface of the passenger service system, it is possible by virtue of such an arrangement of the air nozzles to achieve the effect whereby in each case only some of the air nozzles are visible from passenger seats that are supplied with service functions by the passenger service system. For example a configuration is possible, in which the passenger service system comprises three air nozzles for supplying individual air to three passenger seats disposed in a passenger seat row. From each passenger seat, however, only two air nozzles are visible. Given a reconfiguration of the vehicle cabin, whereby the passenger seat row comprising three seats is replaced by a passenger seat row comprising only two seats, it is then not evident to passengers seated on the passenger seats that the passenger service system is over-equipped with three air nozzles.

A first and a second reading lamp may be disposed next to one another in a direction at right angles to the longitudinal axis of the passenger service system. A third reading lamp may be disposed offset in the direction of the longitudinal axis of the passenger service system relative to the first and the second reading lamp and centrally in a direction at right angles to the longitudinal axis of the passenger service system relative to the first and the second reading lamp. In other words, the reading lamps may be positioned in a triangular configuration. This enables an optimum illumination of each seat of a passenger seat row comprising three seats. What is more, given a reconfiguration of the vehicle cabin, whereby a passenger seat row comprising three seats is replaced by a passenger seat row comprising only two seats, it is similarly guaranteed that an over-equipping of the passenger service system with three reading lamps is not visible to the passengers seated on the seats of a passenger seat row comprising two seats.

A vehicle cabin area according to the invention comprises at least one passenger service system as described above. The vehicle cabin area further comprises an air outlet, which is adapted to supply the vehicle cabin area with conditioned air provided by a central cabin ventilation system. The passenger service system and the air outlet are disposed in such a way relative to one another that a conditioned air stream exiting from the air outlet initially flows over the substantially flat portion of the service surface of the passenger service system and then encounters the buckled portion of the service surface of the passenger service system.

Given such a development of the vehicle cabin area, it is guaranteed that because of the Coanda effect the conditioned air exiting from the air outlet is initially conveyed away from the air outlet along the substantially flat portion of the service surface of the passenger service system. When the conditioned air stream encounters the buckled portion of the service surface the Coanda effect is interrupted and the conditioned air stream is deflected in the direction of an interior of the vehicle cabin area without flowing directly towards passengers seated in the vehicle cabin area. The vehicle cabin area is consequently notable for an optimized guidance of the conditioned air stream exiting from the air outlet.

The passenger service system and the air outlet are preferably disposed in such a way relative to one another that the conditioned air stream exiting from the air outlet encounters the buckled portion of the service surface of the passenger service system at an angle of ca. 70 to 110°, preferably ca. 80 to 100° and particularly preferably ca. 90°. Given a substantially right-angled approach flow of the buckled portion, the buckled portion brings about an optimized deflection of the conditioned air stream in the direction of the interior of the vehicle cabin area.

The vehicle cabin area preferably comprises a plurality of passenger service systems as described above, which are disposed successively in the direction of a longitudinal axis of the vehicle cabin area in such a way that the buckled portions of the service surfaces of the passenger service systems mutually abut in the direction of the longitudinal axis of the vehicle cabin area in order to form a complete buckled portion that extends along the longitudinal axis of the vehicle cabin area. Given such a configuration of the vehicle cabin area, an optimized guidance of a conditioned air stream exiting from the air outlet is guaranteed along the longitudinal axis of the vehicle cabin area throughout the vehicle cabin area. Furthermore, as a result of the complete buckled portion extending along the longitudinal axis of the vehicle cabin area the vehicle cabin area has an attractive design.

A passenger service system as described above and/or a vehicle cabin area as described above is/are usable to particular advantage in an aircraft, in particular a commercial aircraft.

BRIEF DESCRIPTION OF DRAWINGS

There now follows a detailed description of preferred embodiments of the invention with reference to the accompanying diagrammatic drawings, which show in FIG. 1 a cross-sectional representation of an aircraft cabin area, in which a passenger service system is installed, FIG. 2 a three-dimensional representation of a passenger service module of the passenger service system, FIG. 3 a cross-sectional view of a passenger service system, FIG. 4 a sub-region of the passenger service system according to FIG. 3, FIG. 5 a three-dimensional representation of an interior trim panel of the passenger service system according to FIG. 3, FIG. 6 a representation showing the flow paths of individual air exiting from air nozzles of the passenger service system according to FIG. 3 compared to the flow paths of individual air exiting from air nozzles that are integrated into a flat service surface of a passenger service system, and FIG. 7 a three-dimensional representation of an aircraft cabin that is equipped throughout with a passenger service system according to FIG. 3.

DETAILED DESCRIPTION OF EMBODIMENTS

Figure 1:
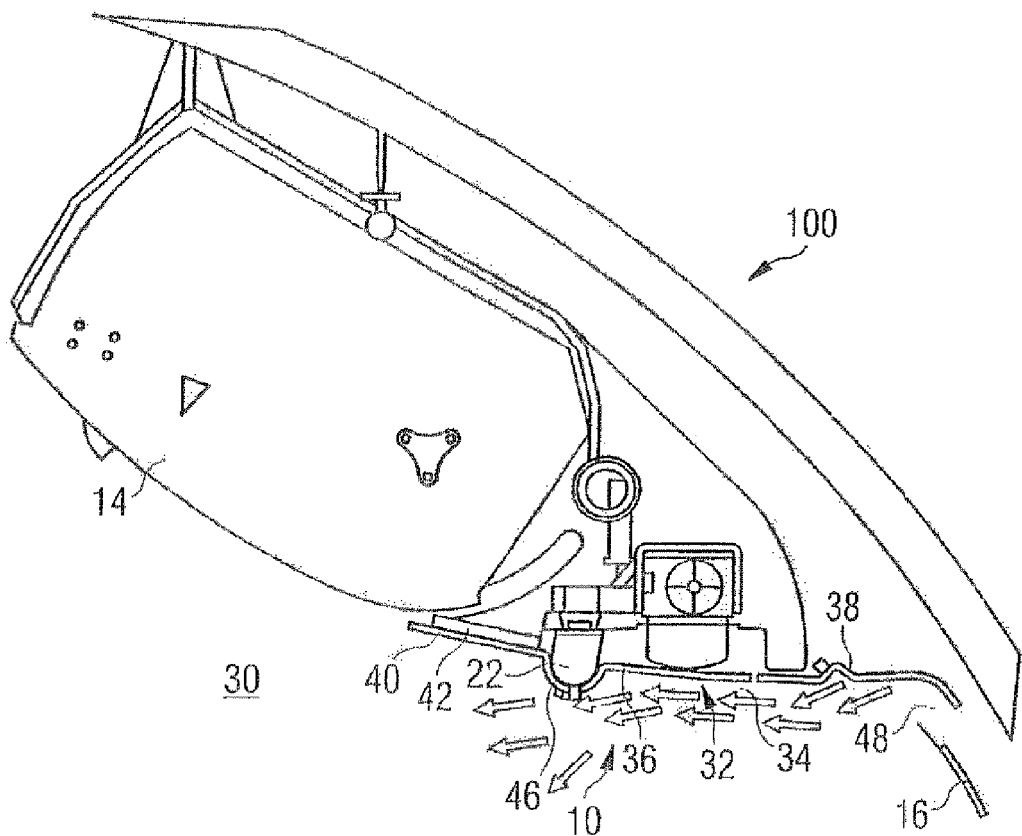
Figure 7:
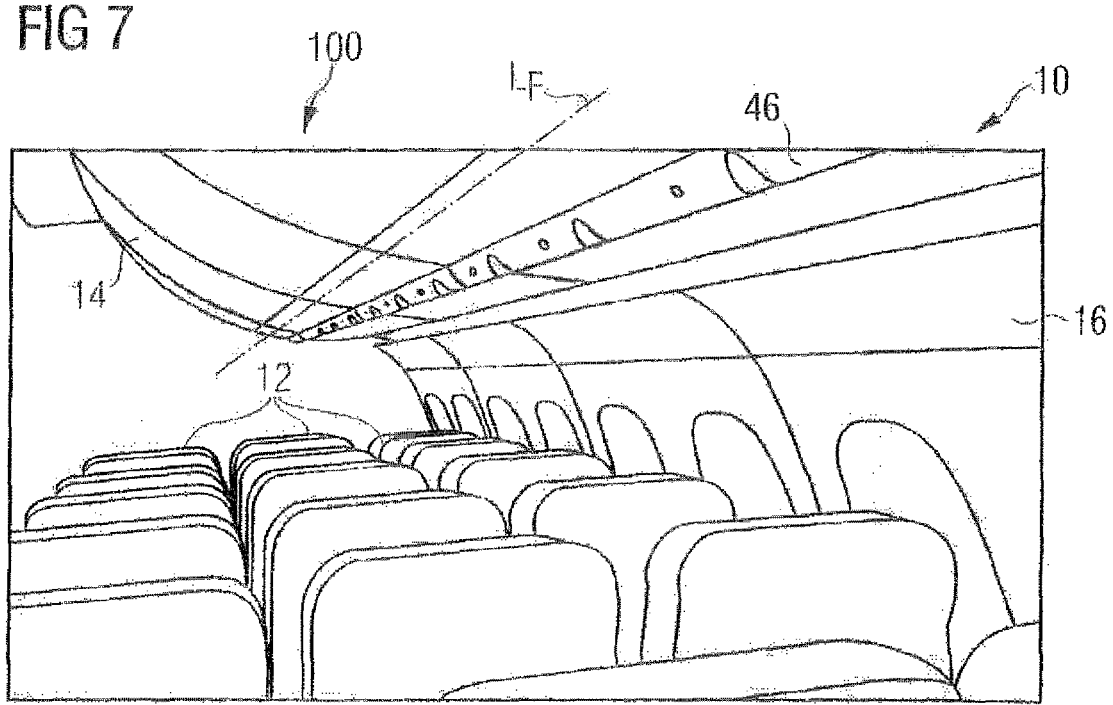

FIGS. 1 and 7 show in each case a vehicle cabin area 100 which, in the embodiment represented here, takes the form of an area of an aircraft cabin, in particular an area of a passenger cabin of a commercial aircraft. In the vehicle cabin area 100 a passenger service system 10 is installed. The passenger service system 10 is disposed in the vehicle cabin area 100 above passenger seats 12 that are provided in the vehicle cabin area 100 (see FIG. 7). In particular the passenger service system 10 is positioned adjacent to an overhead luggage compartment 14. In the direction of a side wall of the vehicle cabin area 100 the passenger service system 10 is disposed in the spatial vicinity of side wall panelling 16.

Figure 2:
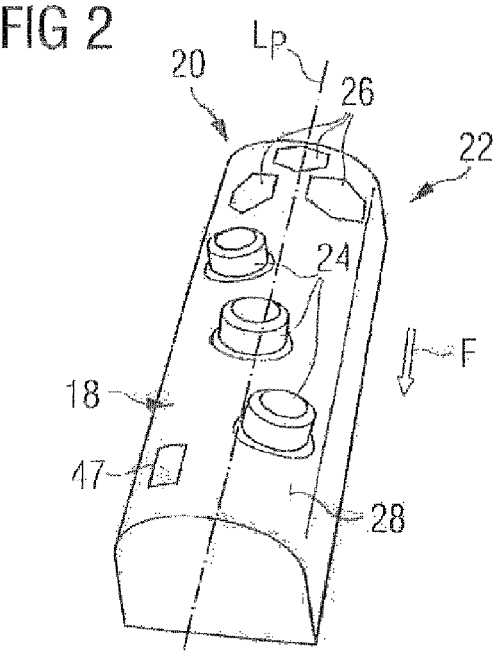
Figure 3:
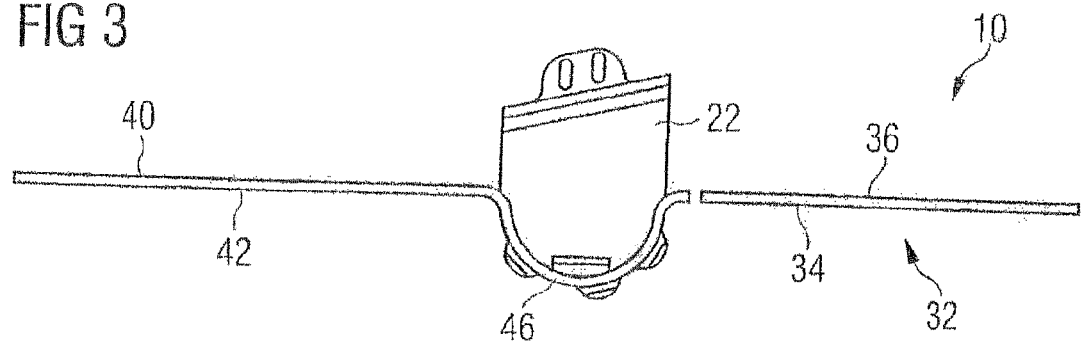
Figure 4:
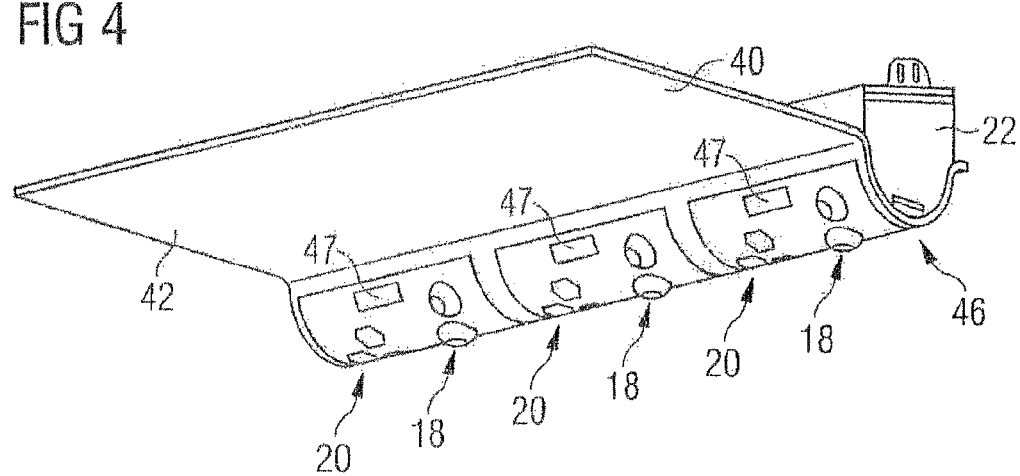

As may be seen from FIGS. 2 to 4, the passenger service system 10 comprises an individual ventilation arrangement 18 and a lighting arrangement 20. The individual ventilation arrangement 18 and the lighting arrangement 20 are integrated in each case into a passenger service module 22 that is illustrated in detail in FIG. 2. In the embodiment of a passenger service module 22 that is shown in FIG. 2 the individual ventilation arrangement 18 comprises three air nozzles 24. The lighting arrangement 20 comprises three reading lamps 26. The passenger service module 22 is consequently capable of supplying service functions to a passenger seat row equipped with three seats 12. The passenger service module moreover comprises a display element 47. The air nozzles 24, the reading lamps 26 and the display element 47 are disposed in each case in a convexly curved surface 28 of the passenger service module 22, i.e. of a passenger service module housing.

In the state of installation of the passenger service system 10 in the vehicle cabin area 100, see FIG. 1, the surface 28 of the passenger service module 22 faces an interior 30 of the vehicle cabin area 100 and hence forms part of a service surface 32 of the passenger service system 10 that extends over the heads of passengers seated on the passenger seats 12. The service surface 32 comprises a substantially flat portion 34 that extends above the passenger seats 12 from the passenger service module 22 to the side wall panelling 16. The substantially flat portion 34 of the service surface 32 is formed by a first interior trim panel 36, which is disposed adjacent to the passenger service module 22, and by a sub-portion of a further first interior trim panel 38, which in the direction of the side wall panelling 16 adjoins the first interior trim panel 36.

Figure 5:
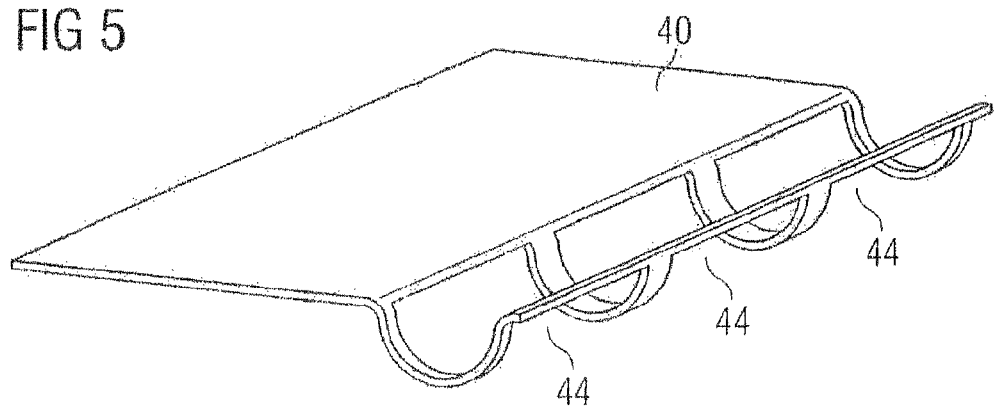

The passenger service system 10 further comprises a second interior trim panel 40. The second interior trim panel 40 extends above the passenger seats 12 between the luggage compartment 14 and the passenger service module 22 and in this region forms a further substantially flat portion 42 of the service surface 34. As is evident in particular from FIG. 5, the second interior trim panel 40 has three cutouts 44. Each of the cutouts 44 is provided for receiving a passenger service module 22 in such a way that a cutout 44 formed in the second interior trim panel 40 exposes the surface 28 of the passenger service module 22 that carries the air nozzles 24 of the individual ventilation arrangement 18 and the reading lamps 26 of the lighting arrangement 20, i.e. makes the surface 28 accessible from the interior of the vehicle cabin area 100 to passengers seated on the passenger seats 12.

The second interior trim panel 40 and the passenger service module 22, i.e. the surface 28 of the passenger service module 22 carrying the air nozzles 24 of the individual ventilation arrangement 18 and the reading lamps 26 of the lighting arrangement 20, together define a convexly curved buckled portion 46 of the service surface 32. In particular the buckled portion 46 of the service surface 32 is defined by the convexly curved surface 28 of the passenger service module 22 and by portions of the second interior trim panel 40 that extend between the cutouts 44. The buckled portion 46 of the service surface 32 extends along a longitudinal axis $L_P$ of the passenger service system 10 between the substantially flat portion 34 of the service surface 32 and the further substantially flat portion 42 of the service surface 32. In the installed state of the passenger service system 10 in the vehicle cabin area 100 the buckled portion 46 also extends parallel to a longitudinal axis $L_F$ of the vehicle cabin area 100 (see in this respect FIG. 7).

The air nozzles 24 of the individual ventilation arrangement 18 are used to supply passengers seated on the passenger seats 12 with individual air, which is fed to the air nozzles 24 by an individual ventilation system that is constructed separately from a centrally regulated cabin ventilation system. The air provided by the centrally regulated cabin ventilation system, on the other hand, is blown into the vehicle cabin area 100 through an air outlet 48 that is disposed in a side wall region of the vehicle cabin area 100 between an upper edge of the side wall panelling 16 and the further first interior trim panel 38.

As is shown in FIG. 1, because of the Coanda effect the conditioned air exiting from the air outlet 48 has the tendency to flow along the substantially flat portion 34 of the service surface 32 in the direction of the interior 30 of the vehicle cabin area 100. After passing the substantially flat portion 34 of the service surface 32 the conditioned air flow encounters the buckled portion 46 of the service surface 32 of the passenger service system 10 at an angle of ca. 90°. As a result the Coanda effect is interrupted and the conditioned air stream is separated from the service surface 32 of the passenger service system 10 and deflected in the direction of the interior 30 of the vehicle cabin area 100. This enables a more uniform distribution of the conditioned air in the vehicle cabin area 100 without incurring the problem of air being blown directly towards passengers seated on the passenger seats 12.

As is represented in FIG. 7, in a vehicle cabin area 100 a plurality of passenger service systems 10 may be disposed successively in the direction of the longitudinal axis $L_F$ of the vehicle cabin area 100 in such a way that the buckled portions 46 of the service surfaces 32 of the passenger service systems 10 mutually abut in the direction of the longitudinal axis $L_F$ of the vehicle cabin area 100 in order to form a complete buckled portion that extends along the longitudinal axis $L_F$ of the vehicle cabin area 100. Such a configuration of the vehicle cabin area 100 guarantees an optimized guidance of the conditioned air stream exiting from a plurality of air outlets 48.

As is evident in particular from FIGS. 2 to 4, the air nozzles 24 of the individual ventilation arrangement 18 and the reading lamps 26 of the lighting arrangement 20 are disposed in the region of the buckled portion 46 of the service surface 32 of the passenger service system 10. Air outlets of the air nozzles 24 are in this case oriented in such a way relative to the longitudinal axis $L_P$ of the passenger service system 10 that individual air streams exiting from the air outlets form in each case an acute angle with the longitudinal axis $L_P$ of the passenger service system. In the installed state of the passenger service system 10 in the vehicle cabin area 100, the flow paths of the individual air streams exiting from the air outlets of the air nozzles 24 run counter to the direction of travel and/or flight F (see FIG. 2) at an acute angle to the longitudinal axis $L_F$ of the vehicle cabin area 100.

Figure 6:
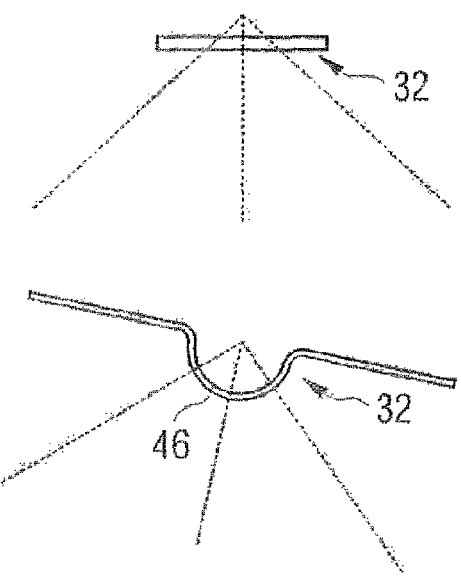

If the air nozzles 24 were installed in a substantially flat portion of the service surface 32 of the passenger service system 10, the air nozzles 24 would have to project relatively far from a surrounding surface region in order to guarantee reliable prevention of a flow separation of the individual air streams. By virtue of the integration of the air nozzles 24 into the buckled portion 46 of the service surface 32 of the passenger service system 10, the distance between an individual air stream exiting from the air outlet of an air nozzle 24 and a region of the service surface 32 surrounding the air outlet is increased as a result of the curved shape of the buckled portion 46 in comparison to an arrangement of the air outlet in a substantially flat region of the service surface 32, see FIG. 6.

Consequently the air nozzles 24, given the same orientation of their air outlets relative to the longitudinal axis $L_P$ of the passenger service system 10, when integrated into the buckled portion 46 of the service surface 32 may project to a lesser extent from a region of the service surface 32 surrounding the air nozzles 24 than would be possible if the air nozzles 24 were integrated into a substantially flat region of the service surface 32. What is more, as a result of the integration of the air nozzles 24 into the buckled portion 46 of the service surface 32 cutouts 52 provided for the air nozzles 24 in the surface 28 of the passenger service module 22 or in an interior trim panel 50 may be designed smaller than would be possible if the air nozzles 24 were integrated into a substantially flat region of the service surface 32.

The three air nozzles 24 are disposed successively in the direction of the longitudinal axis $L_P$ of the passenger service system 10 and offset relative to one another in a direction at right angles to the longitudinal axis $L_P$ of the passenger service system 10. The reading lamps 26 of the lighting arrangement 20, on the other hand, are positioned in a triangular configuration, i.e. a first and a second reading lamp 26 are disposed next to one another in a direction at right angles to the longitudinal axis $L_P$ of the passenger service system 10, while a third reading lamp 26 is disposed offset in the direction of the longitudinal axis $L_P$ of the passenger service system 10 relative to the first and the second reading lamp 26 and centrally in a direction at right angles to the longitudinal axis $L_P$ of the passenger service system relative to the first and the second reading lamp 26.

In a similar fashion to the air nozzles 24, the reading lamps 26 are also integrated into the buckled portion 46 of the service surface 32. By virtue of this arrangement of the air nozzles 24 and the reading lamps 26 it is possible to achieve the effect whereby in each case only two air nozzles 24 and/or two reading lamps 26 are visible to passengers seated on the passenger seats 12. Consequently, given a reconfiguration of the vehicle cabin area 100 whereby a seat row comprising three seats 12 is replaced by a passenger seat row 12 comprising only two seats 12, it is not evident to passengers seated on the passenger seats 12 that the passenger service system 10 is over-equipped with three air nozzles 24 and/or three reading lamps 26.

Furthermore, the display element 47 is disposed in the region of a side wall portion of the buckled portion 46 that, in the state of installation of the passenger service system 10 in a vehicle cabin 100, faces an aisle area of the vehicle cabin 100 and/or is visible from an aisle area of the vehicle cabin 100.

The previously described features of individual embodiments of the passenger service system 10 and the vehicle cabin area 100 may be combined in any desired manner with one another. Any desired interior trim panel configurations are moreover conceivable. For example, it is also possible to use only a single interior trim panel to form part of the buckled portion 46, the substantially flat portion 34 and the further substantially flat portion 42. It is moreover naturally also conceivable to use one interior trim panel to form part of the buckled portion 46 and the substantially flat portion 34 and use a separately constructed interior trim panel to form the further substantially flat portion 42.

The invention claimed is:

1. A passenger service system comprising:
an individual ventilation arrangement, wherein at least one air nozzle of the individual ventilation arrangement is disposed in the region of a service surface of the passenger service system,
wherein the service surface of the passenger service system comprises a substantially flat portion as well as a buckled portion, which is curved convexly relative to the substantially flat portion and extends along a longitudinal axis of the passenger service system.

2. The passenger service system according to claim 1, wherein the individual ventilation arrangement is integrated into a passenger service module, wherein the service surface of the passenger service system is formed at least in sections by at least a portion of a surface of the passenger service module that comprises the at least one air nozzle of the individual ventilation arrangement.

3. The passenger service system according to claim 1, wherein the service surface of the passenger service system is formed at least in sections by at least one interior trim panel.

4. The passenger service system according to claim 3,
wherein the interior trim panel has at least one cutout, which exposes a surface portion of the passenger service module that forms a portion of the service sur-face of the passenger service system.

5. The passenger service system according to claim 1,
wherein the service surface of the passenger service system comprises a further substantially flat portion and that the buckled portion extends between the substantially flat portion and the further substantially flat portion of the service sur-face of the passenger service system.

6. The passenger service system according to claim 5,
wherein the substantially flat portion of the service surface of the passenger service system is formed by a first interior trim panel, and wherein the further substantially flat portion of the service surface of the passenger service system is formed by a second interior trim panel.

7. The passenger service system according to claim 1,
wherein a display element is disposed in the region of the buckled portion of the service surface of the passenger service system.

8. The passenger service system according to claim 1,
wherein the at least one air nozzle of the individual ventilation arrangement is disposed in the region of the buckled portion of the service surface of the passenger service system.

9. The passenger service system according to claim 8,
wherein an air outlet of the at least one air nozzle is oriented in such a way relative to the longitudinal axis of the passenger service system that an individual air stream exiting from the air outlet forms an acute angle with the longitudinal axis of the passenger service system.

10. The passenger service system according to claim 1,
wherein a plurality of air nozzles are disposed successively in the direction of the longitudinal axis of the passenger service system and offset relative to one another in a direction at right angles to the longitudinal axis of the passenger service system.

11. The passenger service system according to claim 1,
wherein a first and a second reading lamp are disposed next to one another in a direction at right angles to a longitudinal axis of the passenger service system, and wherein a third reading lamp is disposed offset in the direction of the longitudinal axis of the passenger service system relative to the first and the second reading lamp and centrally in a direction at right angles to the longitudinal axis of the passenger service system relative to the first and the second reading lamp.

12. A vehicle cabin area comprising:
an individual ventilation arrangement, wherein at least one air nozzle of the individual ventilation arrangement is disposed in the region of a service surface of the passenger service system,
wherein the service surface of the passenger service system comprises a substantially flat portion as well as a buckled portion, which is curved convexly relative to the substantially flat portion and extends along a longitudinal axis of the passenger service system, and
an air outlet, which is adapted to supply the vehicle cabin area with conditioned air provided by a central cabin ventilation system, wherein the passenger service system and the air outlet are disposed in such a way relative to one another that a conditioned air stream exiting from the air outlet initially flows over the substantially flat portion of the service surface of the passenger service system and then encounters the buckled portion of the service surface of the passenger service system.

13. The vehicle cabin area according to claim 12,
wherein the passenger service system and the air outlet are disposed in such a way relative to one another that the conditioned air stream exiting from the air outlet encounters the buckled portion of the service surface of the passenger service system at an angle of approximately 70 to 110°.

14. The vehicle cabin area according to claim 12,
further comprising a plurality of individual ventilation arrangements, which are disposed successively in the direction of a longitudinal axis of the vehicle cabin area in such a way that the buckled portions of the service surfaces of the passenger service systems mutually abut in the direction of the longitudinal axis of the vehicle cabin area in order to form a complete buckled portion that extends along the longitudinal axis of the vehicle cabin area.

15. Use of a passenger service system according to claim 1 in an aircraft.

16. Use of a vehicle cabin area according to claim 12 in an aircraft.

* * * * *